Oct. 8, 1957 — F. PALMERE — 2,808,613
OYSTER AND CLAM OPENER
Filed Dec. 22, 1955
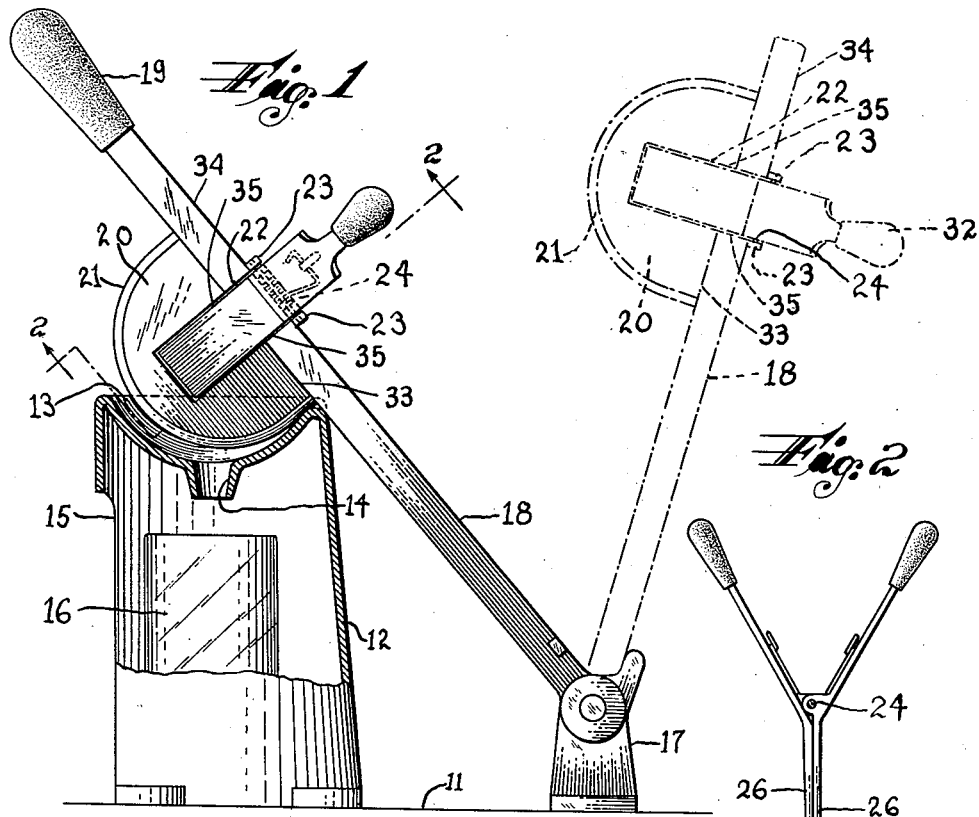
INVENTOR.
*Frank Palmere*
BY *Norman N. Popper*
ATTORNEY

United States Patent Office 2,808,613
Patented Oct. 8, 1957

2,808,613

OYSTER AND CLAM OPENER

Frank Palmere, West Orange, N. J.

Application December 22, 1955, Serial No. 554,874

4 Claims. (Cl. 17—9)

My invention relates generally to oyster and clam openers and specifically to oyster and clam openers that enable the convenient openings of oysters or clams so that they may be served on the half shell.

It is among the objects of my invention to provide an oyster or clam opener that separates the shells from each other without damaging the clam or oyster.

It is a further object of my invention to provide an oyster or clam opener that saves the nutritive juices of the clam.

It is a further object of my invention to provide an oyster or clam opener which addresses its blade to the oyster or clam at the most advantageous angle for insertion.

It is yet a further object of my invention to provide an oyster or clam opener that presents its blade for intrusion between the shells so that the levers exert the maximum effect for prying shells apart.

These objects and advantages, as well as other objects and advantages, may be achieved by the device illustrated in the drawings in which:

Figure 1 shows a side elevational view of my oyster or clam opener in such position as it might assume when it has entered between the shells of the oyster or clam and showing in dotted lines, the device withdrawn from the clam or oyster the housing is broken away to show a cross-section;

Figure 2 is an end cross-sectional view of the levers and blade on an enlarged scale taken on the lines 2—2 in Figure 1;

Figure 3 is an exploded view on an enlarged scale of the levers separated with the spring disassembled;

Figure 4 is an end cross-sectional view showing the blade and lever disconnected from the shaft 18 intruded between the shells of a clam or oyster preparatory to prying them apart; and Figure 5 is a cross-sectional view showing the levers and blade inserted in a clam or oyster, the same having been pressed together so that the jaws thereof pry apart the shells.

Referring now to the drawings in detail, my oyster or clam opener provides a base 11 on which there is mounted a housing 12. The housing has a depression 13 on the top adapted to receive and hold upright a clam, oyster, or similar bivalve. The bottom of this depression 13 has an opening 14 for the discharge of clam or oyster juice falling into the depression 13. The housing has a frontal opening 15 to provide for the admission of a receptacle or glass 16 into which the juice of the clam or oyster may fall from the opening 14. A support 17 is also mounted on the base 11. On this support, there is pivotally mounted a shaft 18 having a handle 19 at the end opposite the pivotal mounting. Extending from the bottom 33 of the shaft 18 is an arcuate blade 20 provided with a sharpened edge 21. A central rectangular opening 22 extends from the top 34 of the shaft 18 down into the blade 20. The opening 22 thus divides the shaft 18 into two parts, the upper part 34 being separated from the main part of the shaft 18 by the slot 22 which defines an opening for the extensions 26. The two parts of the shaft 18, 34 are thus joined together by the blade 20 into which the opening 22 is also extended. On top of the shaft 18 on either side 35 of the opening 22 there are formed lugs 23 adapted to receive a shaft 24. This shaft 24 carries a pair of levers 25. The levers are formed with angularly disposed extensions 26 which serve to pry the shells 27 of the bivalve apart. These extensions or prying portions 26 extend substantially the full length of the slot 22. The levers each have a pair of lugs 28 formed thereon. The lugs have passages extending therethrough. When the lugs 28 are disposed in juxtaposition with the passages 29 in register with each other, they will receive the shaft 24 which passes through the lugs 23 on top of the shaft 18. Thus, the levers 25 will be pivotally mounted on the shaft 18. The axle 24 will also carry a spring 30 which will be engaged with the ears 31 on the handles and will normally urge the extended portions 26 of the levers together.

The operation of my clam or oyster opener is as follows:

With the shaft 18 in the position shown by the dotted lines in Figure 1, a clam or oyster is disposed in the depressed area 13 in the top of the housing 12. The blade 20 is then advanced until its sharp edge 21 is in coincidence with the space between the shells 27. The handle 19 is then forcibly pressed to cause the blade 20 to enter into the space between the shells 27. The portions 26 are normally disposed in the plane of the blade and will consequently follow the blade 20 into the shell of the bivalve since they lie within the rectangular opening 22 in the shaft 18 and the blade 20. The handles 32 are now pressed together, causing the extended portions 26 to pivot outwardly away from each other as the action of the spring 30 is overcome. This causes the shells 27 of the cam or oyster to move from the position shown in Figure 4 to the position shown in Figure 5. The muscle of the clam or oyster, if it has not been severed by the edge of the blade 21, is ruptured by this prying operation and the clam or oyster is opened ready for use. The juices of the clam or the oyster go from the shell into the depression 13 and out of the opening 14 into the receptacle 16.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A bivalve opener comprising a slotted blade, a divided shaft attached to the blade with a slot in correspondence with the slot in the blade, a pair of opposed levers pivotally mounted across the slot in the shaft, prying members on said levers normally disposed in the slot, a pair of handles normally diverging from each other on said levers, and a spring normally urging the prying members together.

2. A bivalve opener comprising a slotted blade, a divided shaft attached to the blade with a slot in correspondence with the slot in the blade, a pair of opposed levers pivotally mounted across the slot in the shaft, one pair of ends of the levers defining prying members and disposed in the slot in the blade, a spring normally urging the prying members together, the other pair of ends of the levers normally diverging from each other and defining handles, a seat for holding a bivalve to receive the blade between its shell edges.

3. A bivalve opener comprising a slotted blade, a pivotally mounted divided shaft attached to the blade with a slot in correspondence with the slot in the blade, a pair of opposed levers pivotally mounted on the shaft, a pair of angularly disposed ends on the levers defining prying members, said prying members disposed in the slots in the blade and shaft, a spring normally urging the prying members together, another pair of ends on the levers normally diverging from each other, a housing, a seat defined in the housing for holding a bivalve and provided with an aperture for discharging liquid disposed therein, whereby the blade and prying members may be pivoted to enter between the shell edges of a bivalve disposed on the seat, and whereby the movement of the diverging ends toward each other will effect a corresponding opposite movement of the opposed prying members, whereby the shells of the bivalve will be spread apart.

4. A bivalve opener comprising a blade adapted to be inserted in a bivalve, a shaft attached to the blade, said shaft and blade being provided with a slot extending toward the edge of the blade and adapted to receive a pair of prying members, a pair of opposed prying members pivotally mounted on the shaft across the slot and normally lying in the slot in the plane of the blade, handles on the prying members normally disposed in diverging relation to each other when the prying members are disposed in the plane of the blade, a spring normally urging the prying members together and the handles apart.

References Cited in the file of this patent
UNITED STATES PATENTS

| | | |
|---|---|---|
| 411,797 | Farrell | Oct. 1, 1889 |
| 896,162 | Roters | Aug. 18, 1908 |
| 1,071,352 | Schmidt | Aug. 26, 1913 |

FOREIGN PATENTS

| | | |
|---|---|---|
| 2,574 | Great Britain | Dec. 9, 1893 |